United States Patent
Biegert et al.

(10) Patent No.: US 6,706,435 B1
(45) Date of Patent: Mar. 16, 2004

(54) FUEL CELL WITH POLYMER ELECTROLYTE MEMBRANE

(75) Inventors: Hubertus Biegert, Ulm (DE); Peter Britz, Kirchheim (DE); Arnold Lamm, Oberelchingen (DE); Gabor Toth, Illertissen-Jedesheim (DE); Peter Urban, Amberg (DE)

(73) Assignee: Ballard Power Systems, Inc., Burnaby (CA)

( * ) Notice: Subject to any disclaimer, the term of this patent is extended or adjusted under 35 U.S.C. 154(b) by 0 days.

(21) Appl. No.: 10/009,342

(22) PCT Filed: Jun. 2, 2000

(86) PCT No.: PCT/EP00/05052
§ 371 (c)(1),
(2), (4) Date: Apr. 8, 2002

(87) PCT Pub. No.: WO00/77873
PCT Pub. Date: Dec. 21, 2000

(30) Foreign Application Priority Data

Jun. 10, 1999 (DE) .......................... 199 26 353

(51) Int. Cl.$^7$ ............................................ H01M 08/10
(52) U.S. Cl. .......................................... 429/33; 429/30
(58) Field of Search ..................... 429/30, 33

(56) References Cited

U.S. PATENT DOCUMENTS

| | | | |
|---|---|---|---|
| 5,525,436 A | 6/1996 | Savinell et al. ............... | 429/30 |
| 5,795,496 A | 8/1998 | Yen et al. .................. | 252/62.2 |
| 6,376,118 B1 * | 4/2002 | Bruck et al. .............. | 429/30 X |
| 6,582,847 B1 * | 6/2003 | Bruck et al. .................. | 429/42 |

FOREIGN PATENT DOCUMENTS

DE     195 42 475      11/1995

OTHER PUBLICATIONS

"Synthesis and characterization of novel acid–base polymer blends for application in membrane fuel cells"; Jochen Kerres et al., Solid State Ionics, 125 (1999) 243–249 (No month).

"Electrochemical characterisation of sulfonated polyether-ketone membranes", B. Bauer et al., Journal of New Materials for Electrochemical Systems, Bd. 3, Nr. 2, 2000, pp. 93–98 (No month).

"A $H_2/O_2$ fuel cell using acid doped polybenzimidazole as polymer electrolyte", Electrochimica Acta, GB, Elsevier Science Publishers, Barking, Feb. 1, 1996, Seiten 193–197.

* cited by examiner

Primary Examiner—John S. Maples
(74) Attorney, Agent, or Firm—Crowell & Moring LLP

(57) ABSTRACT

A fuel cell includes at least one cell that contains a proton-conducting polymer electrolyte membrane, which separates an anode compartment and a cathode compartment. The membrane is comprised of a thermoplastic polymer that has a permanent service temperature of at least 100° C.

11 Claims, 2 Drawing Sheets

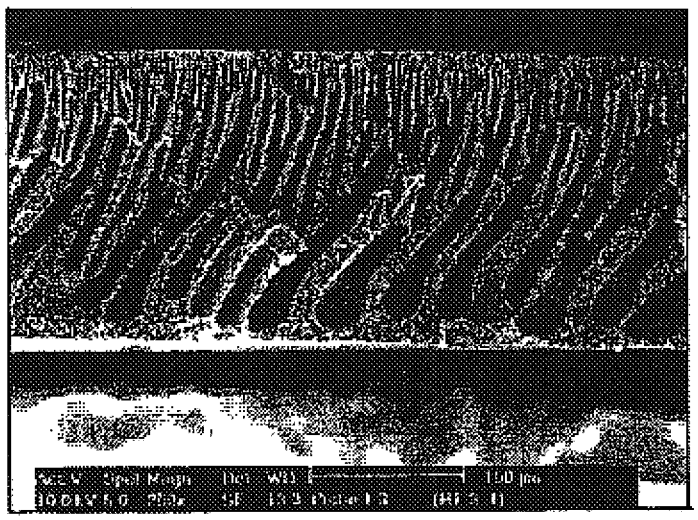
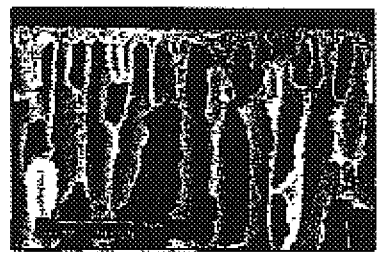
Fig. 3a
Fig. 3b
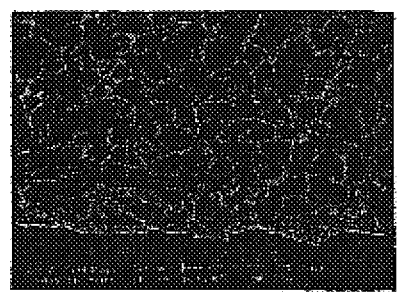
Fig. 3c
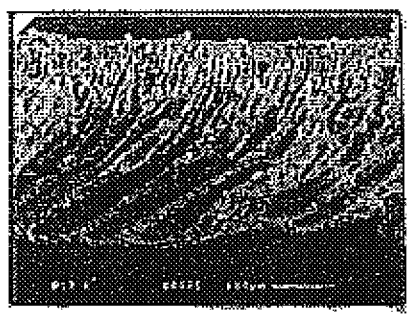 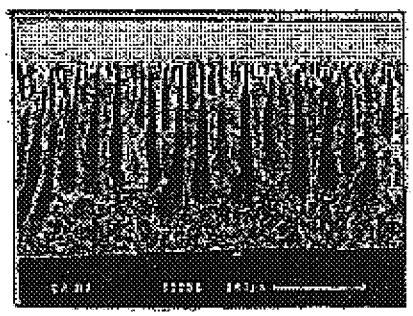
Fig. 4a   Fig. 4b
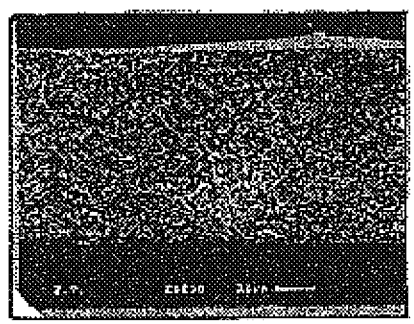 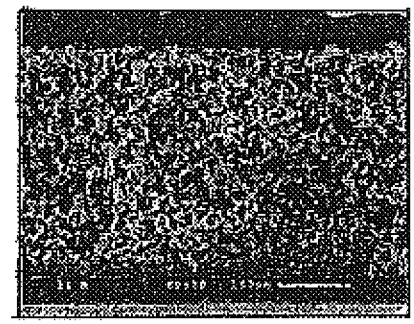
Fig. 4c   Fig. 4d

FUEL CELL WITH POLYMER ELECTROLYTE MEMBRANE

BACKGROUND AND SUMMARY OF INVENTION

The invention relates to a fuel cell with a proton-conducting polymer electrolyte membrane.

Polymer-electrolyte fuel cells, such as are known from DE-A1-195 42 475 (U.S. Pat. No. 5, 928,807), are equipped with semi-permeable membranes, which separate an anode compartment and a cathode compartment of the fuel cell from one another, but are designed to enable the transport of protons from the anode to the cathode.

From the contribution made by Wang et al. "A H2/O2 fuel cell using acid doped polybenzimidazole as polymer electrolyte" in Electrochimica Acta, GB, Vol. 41, No. 2, of Feb. 1, 1996, pages 193–197, but also from the generic U.S. Pat. No. 5, 525,436, is known a thermoplastic polymer, which is used as the membrane in a PEM fuel cell that is operated at more than 120° C. The polymer is phosphoric acid-doped polybenzimidazole. FUEL CELL WITH POLYMER ELECTROLYTE MEMBRANE One customary membrane is a fluoropolymer, e.g. Nafion™, which remains stable at the fuel cell operating temperatures of approximately 80° C.–100° C., and which is characterized by high ionic conductivity for protons.

In addition to the high cost of this type of membrane, a further problem arises with fuel cells of this type if pure media, above all pure hydrogen, are not used, and instead media containing hydrocarbons are used, in which the hydrogen must first be separated out to allow operation of the fuel cell. This causes the hydrogen to reach the anode compartment contaminated with carbon monoxide and carbon dioxide. While the presence of carbon dioxide is not critical, already small quantities of carbon monoxide will cause catalysts in the fuel cell system, such as platinum, that come into contact with the pollutants to become contaminated.

This problem is further intensified in that, in order to reclaim unused hydrogen, the exhaust gas from the reaction is normally fed at least partially into the circuit, which allows the carbon monoxide content to become concentrated.

In order to prevent this undesirable contamination of the catalysts, costly purification measures must be performed to keep the carbon monoxide concentration low enough, preferably far below 0.5% by volume. The necessary gas purification steps are expensive, and tend to reduce the degree of effectiveness of the fuel cell system.

An object of the invention is to provide a fuel cell, for the operation of which a carbon monoxide concentration of 2% by volume can be achieved, without requiring additional cleaning measures.

The object is attained according to preferred embodiments of the fuel cell according to the present invention.

A fuel cell as specified in the invention is comprised of a membrane made of a thermoplastic polymer, which has a permanent service temperature of at least 100° C. The advantage of using this polymer is that it allows the temperature level of the arrangement as a whole to be raised. The result is that the so-called Boudouard equilibrium, which determines the ratio of carbon monoxide, carbon dioxide, and carbon in a reformate of a medium containing hydrocarbons, is shifted in favor of the non-critical carbon dioxide and to the disadvantage of the harmful carbon monoxide; in other words, less carbon monoxide forms in a gas purification stage that is connected to the fuel cell, and/or prior to entry into the anode compartment.

At the same time, a further consequence is that the anode catalyst, preferably platinum, adsorbs considerably less carbon monoxide, and thus can tolerate higher carbon monoxide concentrations in the gas flow.

The fuel cell is most preferably operated at a permanent service temperature of at least 120° C.

Another advantage of the high temperature level of the fuel cell is that the expenditure required for cooling the reaction gas, which normally exhibits temperatures of approximately 300° C. upon exiting the gas purification system at the inlet to the fuel cell, is reduced considerably. Substantial improvements in the degree of effectiveness of the fuel cell arrangement are made possible by saving money on gas purification and on the cooling system.

One preferred membrane is comprised of one or more polymers and/or copolymers and/or polymer blends of polysulphone (PSU), polyether sulphone (PES), polyether etherketone (PEEK), polyimide (PI), and polybenzimidazole (PBI).

In addition, the membrane is preferably made of an asymmetrical polymer that is permeated with pores extending from one flat surface of the membrane to the other flat surface. One of the flat surfaces of the membrane is also provided with a continuous coating layer made of the same polymer, so that the membrane area that is permeated with the pores forms a support structure for the coating layer. The pore diameter may be constant along its longitudinal axis, or may increase from one flat surface to the other; preferably the pores having a small diameter extend away from the coating layer.

The advantage of the coating layer that is protected by the protective structure is that the continuous coating layer allows a higher pressure gradient to be maintained between the anode compartment and the cathode compartment, with simultaneous favorable proton conductivity.

The membrane is most preferably modified, in order to increase its ionic conductivity. The membrane is preferably bombarded with electromagnetic and/or particle radiation, so that radiation-induced defect points will contribute to proton conductivity. A further preferred modification consists in providing the thermoplastic polymer with agents, for example, functional groups, which increase the proton conductivity.

In addition to increasing the effectiveness of the system via lower gas purification and gas cooling requirements, the fuel cell specified in the invention also enables an increase in the power density of the fuel cell as a result of the increased service temperature and/or the increased operating pressure.

Other objects, advantages and novel features of the present invention will become apparent from the following detailed description of the present invention when considered in conjunction with the accompanying drawings.

BRIEF DESCRIPTION OF THE DRAWINGS

FIGS. 3a–3c show scanning electron microscope images of a preferred membrane of a fuel cell as specified in the invention, and FIGS. 4a–4d show scanning electron microscope images of polymers having various production parameters.

DETAILED DESCRIPTION OF THE DRAWINGS

Fluoropolymer membranes that are used in conventional fuel cells having a polymer electrolyte membrane can be exposed to a permanent service temperature of approximately 80° C. If the membrane is exposed to up to 120° C., discolorations in the membrane will signal the start of an irreversible change in the material.

Instead, with the fuel cell specified in the invention, membranes are used which allow a permanent service temperature that is far above 80° C. These membranes may be comprised of symmetrical or asymmetrical thermoplastic polymers and/or their copolymers and/or their polymer blends.

One fuel cell according to the invention is comprised of at least one cell having an anode compartment and a cathode compartment, wherein the cathode and the anode are separated by a thermoplastic polymer membrane, which allows a permanent service temperature of at least 100° C. The fuel cell is most preferably comprised of a stack containing a multitude of such cells.

Favorable polymers and/or copolymers and/or polymer blends are comprised of polysulphone (PSU), polyether sulphone (PES), cellulose acetate (CA), polyacrylonitrile (PAN), polyether etherketone (PEEK), polyimide (PI), and/or polybenzimidazole (PBI), which tolerate a high permanent service temperature. The individual polymer names should be understood in an expanded sense; for instance, the term polysulphone should be understood not only as a polymer that contains alkyl groups in its chain; rather, this term should also include those polymers that contain only aryl groups in the chain, and that sometimes are classified as polyaryl sulphones. In any case, favorable materials include those that are used, for example, to enclose high-temperature electronic and/or high-performance electronic components, which are designed to be used comparable temperature ranges of 100° C. to 300° C.

Figure 1:
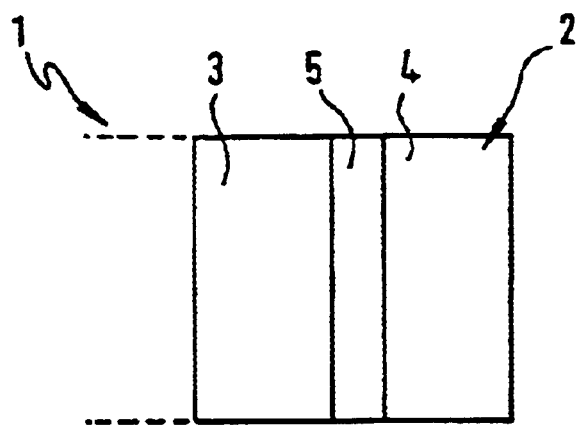
FIG. 1 shows a schematic illustration of a fuel cell as specified in the invention.

In FIG. 1, a schematic arrangement of a fuel cell with a stacked construction, as specified in the invention, is depicted. A fuel cell 1 contains at least a first cell 2, comprised of a cathode compartment 3 and an anode compartment 4, which are separated by a polymer electrolyte membrane 5. A permeate, such as hydrogen protons, reaches from the anode side to the cathode side of the membrane 5 through the polymer. Additional cells in the fuel cell and customary supply connections are not illustrated here.

Figure 2:
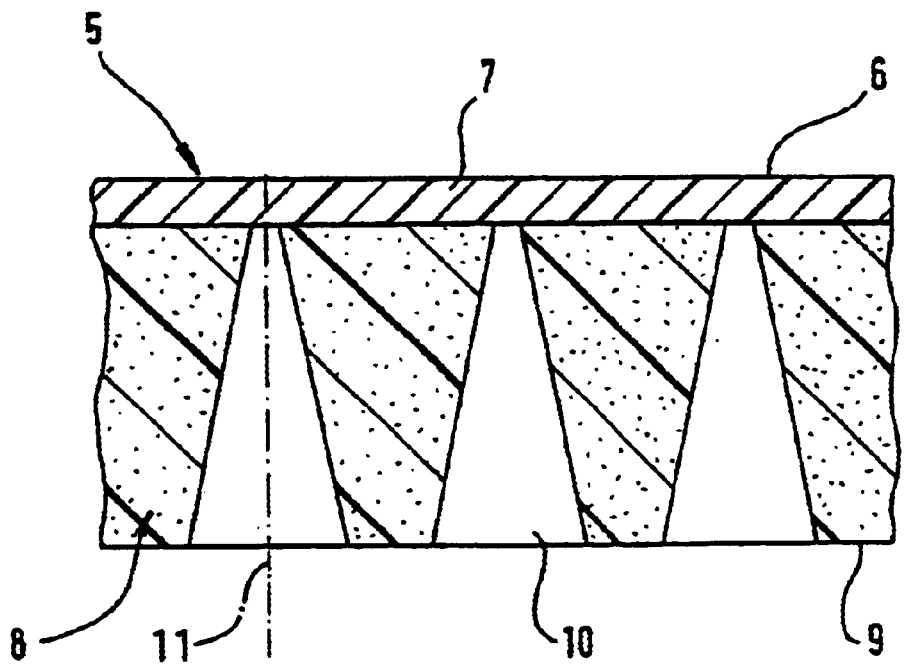
FIG. 2 shows a schematic cross-section of a membrane in a fuel cell as specified in the invention.

In FIG. 2, a preferred membrane for a fuel cell specified in the invention is shown in cross section. A preferred membrane 5 is formed from a so-called asymmetrical polymer. This polymer is comprised of two areas. The asymmetrical membrane 5 is equipped with a thin, continuous coating layer 7 on a first flat surface 6 of the membrane 5; this coating layer is arranged on a polymeric, porous support structure 8 that has pores 10 that extend from the first flat surface 6 to the next flat surface 9.

A permeate, which is transported, for example, from the anode side to the cathode side of the membrane 5, needs to travel only a short distance through the coating layer 7, in comparison with the entire thickness of the membrane 5. The permeability of the membrane is also very high. At the same time, this thin coating layer 7 is stabilized by the porous support structure 8, which is highly advantageous for the mechanical properties of the coating layer 7, compared with a comparable, separate, thin layer of the same type. The membrane 5 is thus stable against a high-pressure difference.

The embodiment of the coating thickness 7 and the support structure 8 can be easily controlled via process parameters in the production of the polymer. At that time it can be established whether the pores 10 will have a largely constant diameter or a varying diameter along their longitudinal axis 11, as is illustrated in the figure. The pore diameter is preferably smaller at the coating layer 7 than at the open-pored flat surface 9 of the membrane 5.

FIGS. 3a–3c show scanning electron microscope images of a membrane in a fuel cell as specified in the invention. In FIG. 3a, the continuous coating layer, in the upper area of the image, is arranged on a porous support structure. In FIG. 3b, the upper area of the membrane is enlarged, and the continuous coating layer can be clearly recognized. In FIG. 3c, a view of the open-pored underside of the membrane (corresponding to the flat surface 9 of the membrane 5 shown in FIG. 2) can be recognized.

Such preferred asymmetrical membranes can be produced via a so-called phase inversion process known from the art. In this process, a membrane is converted from a predominantly liquid phase to a predominantly solid phase via precipitation. In the precipitation, the "polymer distribution state" that is current at the time of precipitation is frozen in dependence upon the thermodynamics of the system. Thus, by altering the production parameters, the inner structure of the membrane may be altered. Based upon the production conditions, an asymmetrical polymer or a symmetrical polymer can be formed.

FIGS. 4a–4d show four scanning electron microscope images of polymers produced in different ways. As is shown here, polymers having pores that extend at an angle from one flat surface to the other (4a), polymers having pores that extend straight (4b), or even polymers without an asymmetrical structure (4c) or with pores that have a granular inner structure (4d) can be formed (images viewed from left to right and top to bottom).

The phase inversion process is advantageously dependent upon the selection of the solvent in which the initial material of the polymer is dissolved. In this manner, preferred membranes can be correspondingly produced from different polymers.

Due to its asymmetrical structure, the membrane 5 can be exposed to high pressure differences of up to 7 bar, especially up to 6 bar, which is advantageous for the operation of the fuel cell, in terms of increasing its power density.

The thickness of the coating layer preferably ranges from 1 $\mu$m to 50 $\mu$m, most preferably from 1 $\mu$m to 25 $\mu$m; the thickness of the support structure preferably ranges from 10 $\mu$m to 500 $\mu$m, most preferably from 35 $\mu$m to 200 $\mu$m. The pore diameter of the macroscopic pores preferably ranges from 1 $\mu$m to 30 $\mu$m. Microscopic pores may also be formed, with their typical diameter ranging from a few nm up to 1 $\mu$m.

One particularly preferred polymer membrane is envisioned as an asymmetrical polysulphone membrane.

The ionic conductivity, especially the proton conductivity, of the membrane can be adjusted, and preferably increased, in that additional, functional defect points are created in the polymer, which contribute to the ion transport or to the transport of a permeate through the membrane. The term functional defect is understood to mean that a chemically functional group that is suited to the given polymer, for example, $SO_3$- and/or $PO_2$-groups in the case of a polysulphone polymer, are mixed as an additive into the polymer, for example, as an additive with ion exchange activity such as zeolite; and/or the term may be understood to mean that the membrane is provided with corresponding functional defects via electromagnetic radiation and/or particle bombardment. What is advantageous is to adjust the coating thickness to the depth of penetration of the radiation with which it is being bombarded. This type of process, with which the ionic conductivity of a polymer can be altered, is known, for example, from DE-A1-195 33 680. Based upon the projectile and/or the type of radiation, the radiation conditions, and the irradiated target, the properties of the polymer can be altered in different ways.

Furthermore, a preferred membrane 5 can be infiltrated with carbon on its open-pored flat surface 9 for the purpose of improving the bonding of the electrolyte in the polymer electrolyte membrane to the attached electrodes, and/or for the purpose of obtaining a larger electrode surface. This also makes it possible for the catalyst to be precipitated directly into the membrane 5 via a suitable precipitation process, preferably an electro-precipitation process. One preferred fuel cell is has a membrane 5 with an asymmetrical structure, a continuous coating layer 7, and a porous support structure 9, wherein catalytic material is embedded in the support structure.

A fuel cell specified in the invention, with a preferred polysulphone membrane, can be used at a permanent service temperature of 120° C. up to 160° C., wherein the membrane will not change, and its proton conductivity will correspond to that of a customary fluoropolymer membrane, such as Nafion™, at a service temperature of 80° C.–110° C., as a result of the implantation of $SO_3$ and/or $PO_3$-groups. The original ionic conductivity of a polysulphone membrane, which amounts to more than 900Ωcm, can thus be reduced by two orders of magnitude.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A fuel cell, comprising:
   at least one cell having of a proton-conducting polymer electrolyte membrane that separates an anode compartment from a cathode compartment,
   wherein the membrane is formed from an asymmetrical thermoplastic polymer that has a permanent service temperature of at least 100° C.

2. A fuel cell according to claim 1, wherein the membrane comprises a continuous coating layer made of a thermoplastic polymer that is applied to a polymeric support structure.

3. A fuel cell according to claim 2, wherein the support structure (8) has pores (10) arranged perpendicular to the coating layer, with the pore diameter expanding as it moves away from the coating layer.

4. A fuel cell according to claim 2, wherein the continuous coating layer has a thickness ranging between 1 μm and 50 μm.

5. A fuel cell according to claim 2, wherein the support structure has a thickness ranging between 10 μm and 50 μm.

6. A fuel cell according to claim 1, wherein the thermoplastic polymer is formed from at least one of a polymers, copolymer, or polymer blend.

7. A fuel cell according to claim 1, wherein the thermoplastic polymer is formed from a polymer selected from the group consisting of polysulphone, polyether sulphone, cellulose acetate, polyacrylic nitrile, polyether etherketone, polyimide, and polybenzimidazole.

8. A fuel cell according to claim 2, wherein an open-pored side of the support structure (8) is additionally infiltrated with carbon.

9. A fuel cell according to claim 1, wherein the thermoplastic polymer has at least one of radiation-induced defects or functional groups for increasing ionic conductivity.

10. A fuel cell according to claim 1, wherein the membrane is configured asymmetrical with a continuous coating layer and a porous support structure, and catalytic material is embedded in the support structure.

11. A fuel cell according to claim 1, wherein the membrane is formed from a thermoplastic polymer that has a permanent service temperature of at least 120° C.

* * * * *